United States Patent
Mansell et al.

(10) Patent No.: US 8,170,270 B2
(45) Date of Patent: May 1, 2012

(54) UNIVERSAL READER

(75) Inventors: Michael Cain Mansell, Victoria (CA); Sonja Christine McLellan, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 11/957,126

(22) Filed: Dec. 14, 2007

(65) Prior Publication Data

US 2009/0154758 A1 Jun. 18, 2009

(51) Int. Cl.
*G06K 9/00* (2006.01)
(52) U.S. Cl. .................. 382/100; 715/201; 715/209
(58) Field of Classification Search .......... 382/100; 715/200, 201, 202, 234, 209, 210
See application file for complete search history.

(56) References Cited

U.S. PATENT DOCUMENTS

| 5,911,776 A | 6/1999 | Guck |
| 6,940,995 B2 | 9/2005 | Choi et al. |
| 2007/0050410 A1* | 3/2007 | Sayuda ............... 707/104.1 |

FOREIGN PATENT DOCUMENTS

| JP | 2000341498 A | * 12/2000 |
| WO | 9534051 | 12/1995 |

OTHER PUBLICATIONS

English Translation of JP2000-341498.*
"Gnostice eDocEngine Advanced Features" retrieved Jul. 12, 2007, 1 page. http://www.gnostice.com/images/edocengine_screen_shots/4.htm.
"Document Conversion Tutorials—Universal Document Converter", fCoder Group, Inc., retrieved Oct. 12, 2011, http://www.print-driver.com/howto/howto_list.html.
"Universal Document Conversion Server", ImageMAKER Development, Inc., retrieved Oct. 12, 2011, http://www.conversionserver.com.
"EXIF.org—EXIF and related resources", retrieved Oct. 12, 2011, http://www.exif.org.
"Portable Network Graphics (PNG) Specification (Second Edition)", W3C, W3C Recommendation Nov. 10, 2003, retrieved Oct. 12, 2011, http://www.w3.org/TR/PNG.
"Terminal Equipment and Protocols for Telematic Services", ITU International Telecommunication Union, The International Telegraph and Telephone Consultative Committee, Sep. 1992, retrieved Oct. 12, 2011, pp. 1-182.
"TIFF Revision 6.0", Revision 6.0, Adobe Developers Association, Jun. 3, 1992, pp. 1-121.

* cited by examiner

*Primary Examiner* — Jon Chang
(74) *Attorney, Agent, or Firm* — Yee & Associates, P.C.; Steven L. Bennett

(57) ABSTRACT

A computer implemented method and computer usable program product for embedding rich content of a document in an image. In one embodiment, a static image of the document is generated. If the amount of memory associated with the rich content does not exceed a threshold amount, the rich content is encoded into a single content block according to an image format. If the rich content does exceed the threshold amount, the rich content is encoded into a plurality of content blocks. The content block or the plurality of content blocks are inserted into an arbitrary storage location of the image. The static image is displayed when the image is opened in an absence of an application associated with the rich content of the document. The rich content is displayed when the image is opened in a presence of the application associated with the rich content of the document.

19 Claims, 6 Drawing Sheets

| PARAMETER | SIZE (BYTES) | DESCRIPTION | |
|---|---|---|---|
| RICH CONTENT BLOCK ID | 4 | THE UNIQUE (TO THIS FILE) ID OF THE RICH CONTENT BLOCK | 604 |
| SEQUENCE NUMBER | 4 | THE SEQUENCE NUMBER, STARTING FROM 1 OF THIS SPLIT BLOCK | 606 |
| DATA LENGTH | 4 | THE NUMBER OF BYTES OF DATA IN THIS SPLIT BLOCK | 608 |
| DATA | N | THE ACTUAL BYTES REPRESENTING THE DATA IN THIS SPLIT BLOCK | 610 |

| PARAMETER | SIZE (BYTES) | DESCRIPTION |
|---|---|---|
| RICH CONTENT BLOCK ID | 4 | THE UNIQUE ID OF THIS RICH CONTENT BLOCK |
| FILE EXTENSION SIZE | 4 | THE NUMBER OF BYTES OF THE FILE EXTENSION |
| FILE EXTENSION | N | THE FILE EXTENSION IN UTF-8 ENCODING |
| MIME TYPE SIZE | 4 | THE NUMBER OF BYTES OF THE MIME TYPE |
| MIME TYPE | N | THE MIME TYPE IN UTF-8 ENCODING |
| DOCUMENT TYPE DESCRIPTION SIZE | 4 | THE NUMBER OF BYTES OF THE DOCUMENT TYPE |
| DOCUMENT TYPE DESCRIPTION | N | THE DESCRIPTION IN UTF-8 ENCODING |
| APPLICATION IRL SIZE | 4 | THE NUMBER OF BYTES OF THE IRL |
| APPLICATION IRL | N | THE IRL |
| NEEDS HELPER | 4 | SET TO 00000000 IF NO, AND 00000001 IF YES |
| DATA LENGTH | 4 | THE NUMBER OF BYTES OF DATA |
| DATA | N | THE ACTUAL BYTES REPRESENTING THE RICH CONTENT |

*FIG. 5*

UNIVERSAL READER

BACKGROUND OF THE INVENTION

1. Field of the Invention

The present invention is related generally to an improved data processing system and in particular to storing data. Still more particularly, the present invention is directed to a computer implemented method and computer usable program product for embedding rich content within images.

2. Description of the Related Art

Currently, many applications use a custom or proprietary document format to represent their data. For example, Microsoft Word™ uses the extension ".doc" to identify documents in Word format. Adobe Acrobat™ uses the extension ".pdf." to identify documents in portable document format (PDF). IBM Lotus Forms™ uses the ".xdfl." extension to identify documents in Lotus Forms. These formats require the application corresponding to the document format to be present on the user's data processing system in order to view and manipulate the content stored in that format.

In other words, to edit a document in a custom document format or a proprietary document format, a compatible version of the application associated with the custom or proprietary document format is needed on the computing device to open, view, and edit the document. If the corresponding application is not present or available to the computing device, the operating system often times provides an error message indicating that the document cannot be opened or viewed by the user. This error message generally provides no clues as to which application software or application version is required to open the document.

The user may attempt to install the corresponding application on the user's computer. However, not all operating systems provide an automatic discovery mechanism to identify the application format of a particular document. Therefore, there may be no easy way for a user to determine which application should be installed in order to display the document. In addition, even if the user discovers which application is necessary through trial and error, the user must still locate, purchase, install, and/or upgrade the corresponding application software on the computing device in order to view and/or manipulate the content of the document. This may be a time consuming, expensive, and burdensome process.

Additionally, installing the software requires sufficient memory being available to store and run the corresponding application software. This may require the user to delete other data stored in memory or purchase additional memory. In addition, the user may not even have a valid operating system that is compatible with the corresponding application that is needed, because most software is only supported on a small set of operating systems. For example, the user may have a Linux® operating system that is not compatible with a Windows® application that is needed to view the document.

In another solution, a static image of the document may be available for viewing. Images, generally, have a longer lifespan than documents, because the applications that open images do not tend to be as difficult to locate and do not require as many upgrades as most applications, such as word processing applications.

However, images cannot be manipulated or edited. Instead, the image can only be viewed using an image viewer application. Thus, the document because less functional and less transferable as the document becomes older and the corresponding application becomes more unavailable, even though the document may still be a very useful and important reference to a user. This problem may be particularly pronounced in data archiving, in which documents may be stored for longer periods of time. When the user retrieves the archived document, there is no clear answer as to whether the document will be useful in the archived document format, because the corresponding application and/or corresponding application version may no longer be available. Thus, the user may not be able to open the archived document on the user's computer to manipulate and/or edit the document.

SUMMARY OF THE INVENTION

The illustrative embodiments described herein provide a computer implemented method and computer usable program product for embedding rich content associated with a document in a document image. In one embodiment, a static image of the document is generated. A determination is made as to whether an amount of memory required by the rich content exceeds a threshold amount of memory. The rich content comprises a rich content version of the document that retains document functionality. In response to determining the amount of memory associated with the rich content does not exceed the threshold amount, the rich content is encoded into a single content block according to an image format to form a rich content block. The rich content block is inserted into an arbitrary storage location associated with the image. The static image of the document is displayed when the image is opened by a computing device in an absence of an application corresponding to the rich content of the document. The rich content is displayed when the image is opened by the computing device in a presence of the application corresponding to the rich content of the document.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a table describing rich content blocks in accordance with an illustrative embodiment;

DETAILED DESCRIPTION OF THE PREFERRED EMBODIMENT

Figure 1:
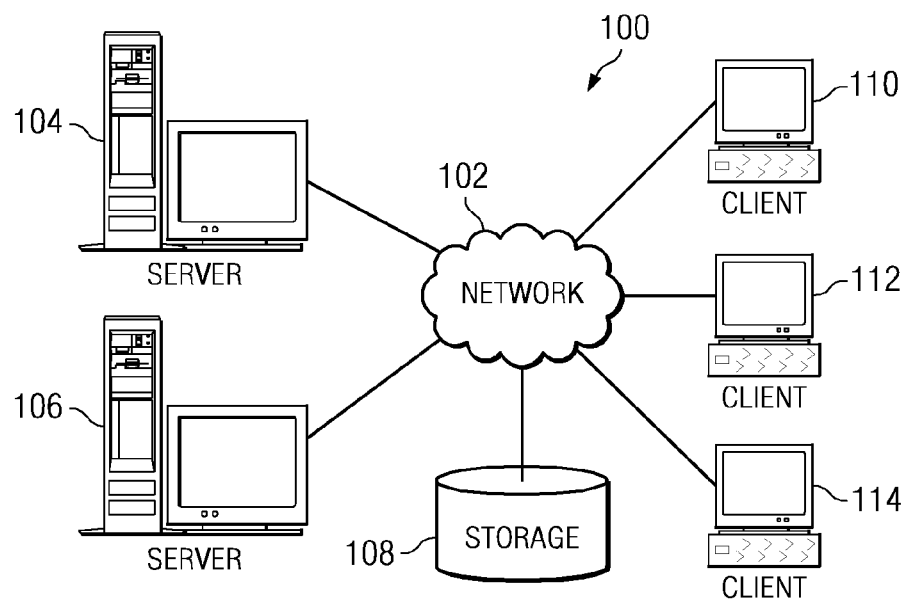
FIG. 1 is a pictorial representation of a network of data processing systems in which illustrative embodiments may be implemented.
Figure 2:
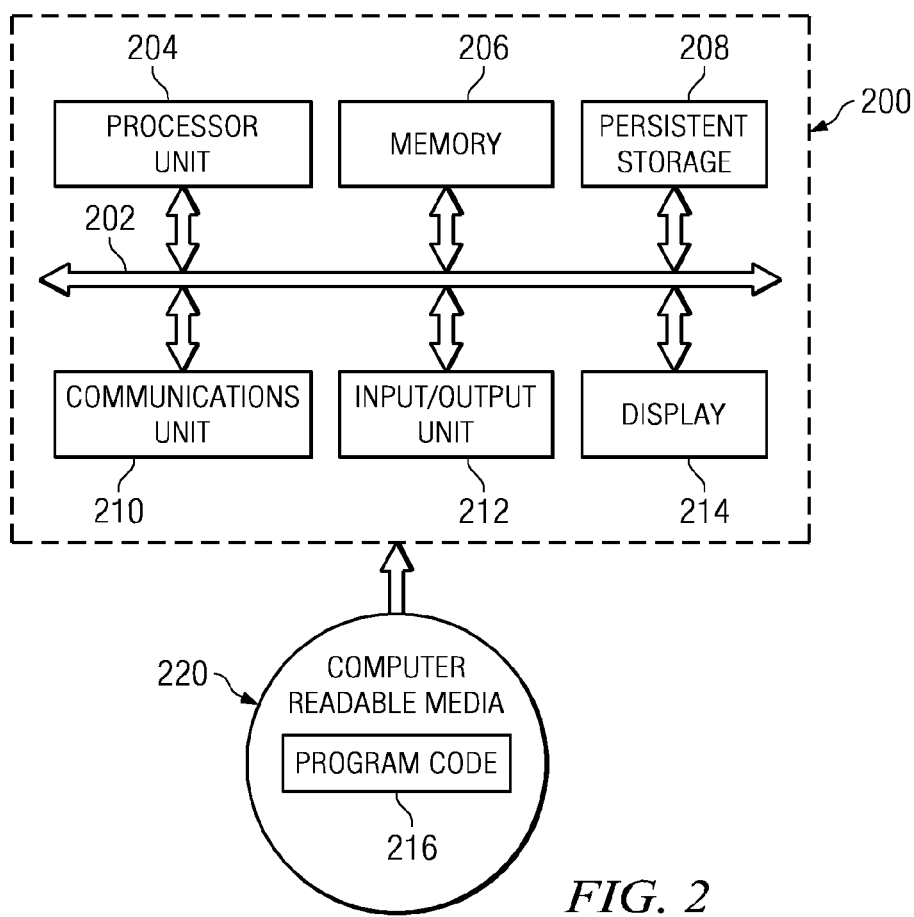
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

In this example, clients 110, 112, and 114 include a universal reader software component. The universal reader converts a document to an image and stores the rich content of the document into rich content blocks within the document. Clients 110, 112, and 114 are used by a set of users to view, edit, and manipulate documents using the universal reader. The term set as used herein refers to one or more. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Some documents require the applications that produce the documents be both available and compatible with the format in which the document is stored on a data processing system. The term application, as used herein, describes any program or process used to create, process, edit, manipulate, and/or utilize functionality associated with documents. Oftentimes, applications that were once compatible with a document are upgraded to a different version or become outmoded. Users need a method to edit a document when the application corresponding to the document format is not available.

Current solutions to this problem store the document as an image and allow the user to view the document as a static image having no functionality. A static image as used herein, is an image for viewing, displaying, presenting, or printing a document, but not editing, manipulating, or otherwise utilizing the functionalities provided by the content of a document in the rich content format of the document. However, the illustrative embodiments recognize that this document may not be useful to a user without the ability to utilize the functionality of the document and/or perform editing or altering of the document content.

The illustrative embodiments recognize a need for a data processing method that is capable of storing the rich content of a document in an image while retaining the ability to utilize document functionality and edit the document when stored. Therefore, the illustrative embodiments provide a computer implemented method and computer program product for viewing and/or editing a document on any data processing system. This universal reader aids in the development and maintenance of documents.

As used herein, the term rich content refers to the format that an application uses to read, write, and store content. This format may be detailed and is usually proprietary. Rich content may, for example, comprise a series of bytes that, when read by the appropriate corresponding application, is displayed with high fidelity in the content and allows the document to retain document functionality. Additionally, rich content also may contain text that includes, but is not limited to, formatting commands for page layout such as fonts, bold, underline, italicize, bullet points, numbering, spacing, text size, and/or text language.

Rich content may also refer to a multimedia document that can include graphical and audiovisual content. Usually, the application allows for the editing of the rich content when the application is present.

On the other hand, an image is a static, visual representation. As used herein, an image is a read-only view of the rich content that does not require the original application to be installed in order to display the image. As used herein, editing is the act of adding, removing, or making any changes to the content of a document. As used herein, viewing is the act of displaying, presenting, or printing a document, but not editing, manipulating, or otherwise utilizing the functionalities provided by the content of a document in the rich content format of the document.

Typically, storage locations exist within the standard image formats for storing metadata regarding the image. The present invention uses this pre-existing storage to store the rich content of a document converted into the image instead of storing metadata. The term image format as used herein refers to the image type identifier, such as and without limitation, joint photographic experts group (".jpeg"), portable network graphics (".png"), and/or tagged image file format (".tiff").

Many image formats exist for storing images. Some common image formats include joint photographic experts group (jpeg) associated with the extensions ".jpeg", ".jpg", or "jpe", portable network graphics associated with the extension ".png", and tagged image file format, associated with the extension ".tiff". Each image format possesses unique characteristics and varies in terms of clarity and composition, which also results in varying sizes for each image format.

The image formats operate on a 'tagged' basis, which means that each block of data within a document has a unique tag that describes the purpose and format of that block. Custom tags are also included in the image. Custom tags allow a user or an application to insert arbitrary data within the file. This arbitrary data has no impact on the display of the image. The universal reader stores a set of structured formatted data within custom tagged blocks. Each image format specification defines the maximum size of a tagged block.

Each document used by the universal reader possesses a certain number of bytes of data. If the rich content in a document exceeds the maximum size of the tagged block as defined by the image format used to convert the document into an image, the universal reader splits the rich content into what are referred to herein as split blocks. Split blocks are rich content blocks split into an appropriate number of blocks needed to store the rich content within an image format. For example, if the rich content document is 36 bytes of data, and the specific image format specification required that the custom tagged blocks could not be more than 30 bytes long, then the universal reader would have to create 2 split blocks to store the data in the image. Splitting the rich content will always require at least two or more split blocks to be generated by the current invention. A set of split blocks as used herein refers to one or more split blocks.

In one embodiment, a static image of the document is generated. The rich content comprises a rich content version of the document that retains document functionality. A rich content version of the document includes the rich content that comprises a series of bytes that, when read by the appropriate corresponding application, is displayed with high fidelity in the content and allows the document to retain document functionality. Additionally, rich content also may contain text that includes, but is not limited to, formatting commands for page layout such as fonts, bold, underline, italicize, bullet points, numbering, spacing, text size, and/or text language. A determination is made as to whether an amount of memory required by the rich content exceeds a threshold amount. In response to a determination that the amount of memory associated with the rich content does not exceed the threshold amount, the rich content is encoded into a single content block according to an image format to form a rich content block. The rich content block is then inserted into an arbitrary storage location of the image.

If the amount of memory associated with the rich content does exceed the threshold amount, the rich content is split into multiple content blocks to form a set of split blocks. The rich content is encoded into a plurality of split content blocks to form the set of split content blocks. The set of split content blocks includes two or more split blocks. The set of split blocks are inserted into an arbitrary storage location of the image.

The static image of the document is displayed when the image is opened by a computing device in the absence of an application associated with the rich content of the document. However, the rich content is displayed when the image is opened by the computing device in the presence of the application associated with the rich content of the document.

Multiple rich content blocks may be present within a given image. Each rich content block is given a unique id number. Each block is expected to be a representation of the same content, but in a different document format. A different document format describes a different application format. The term application as used herein describes any program or process used to process, edit, manipulate, and/or utilize functionality associated with documents. Some examples include without limitation, Microsoft Windows™ data processing software such as, without limitation, Microsoft Word™, Microsoft Excel™, Microsoft Powerpoint™, Microsoft Visio™, Corel WordPerfect™, and IBM Lotus Forums™. Therefore, in an illustrative example of the present invention, one rich content block may in a version for Microsoft Word™ and another rich content block may be in a version for Corel WordPerfect™. The universal reader is expected to process the blocks in numeric order based on the rich content block id. The first rich content block whose editor is present, is chosen. Finally, if no editor is available for the rich content blocks, an image viewer is opened to allow the user to view the image. The term editor, as used herein, is also an application. An application, as described herein, describes any program or process used to process, edit, manipulate, and/or utilize functionality associated with documents. When the application is available on the data processing system, the user is able to edit the document using that application to manipulate the rich content embedded within the image.

Figure 3:
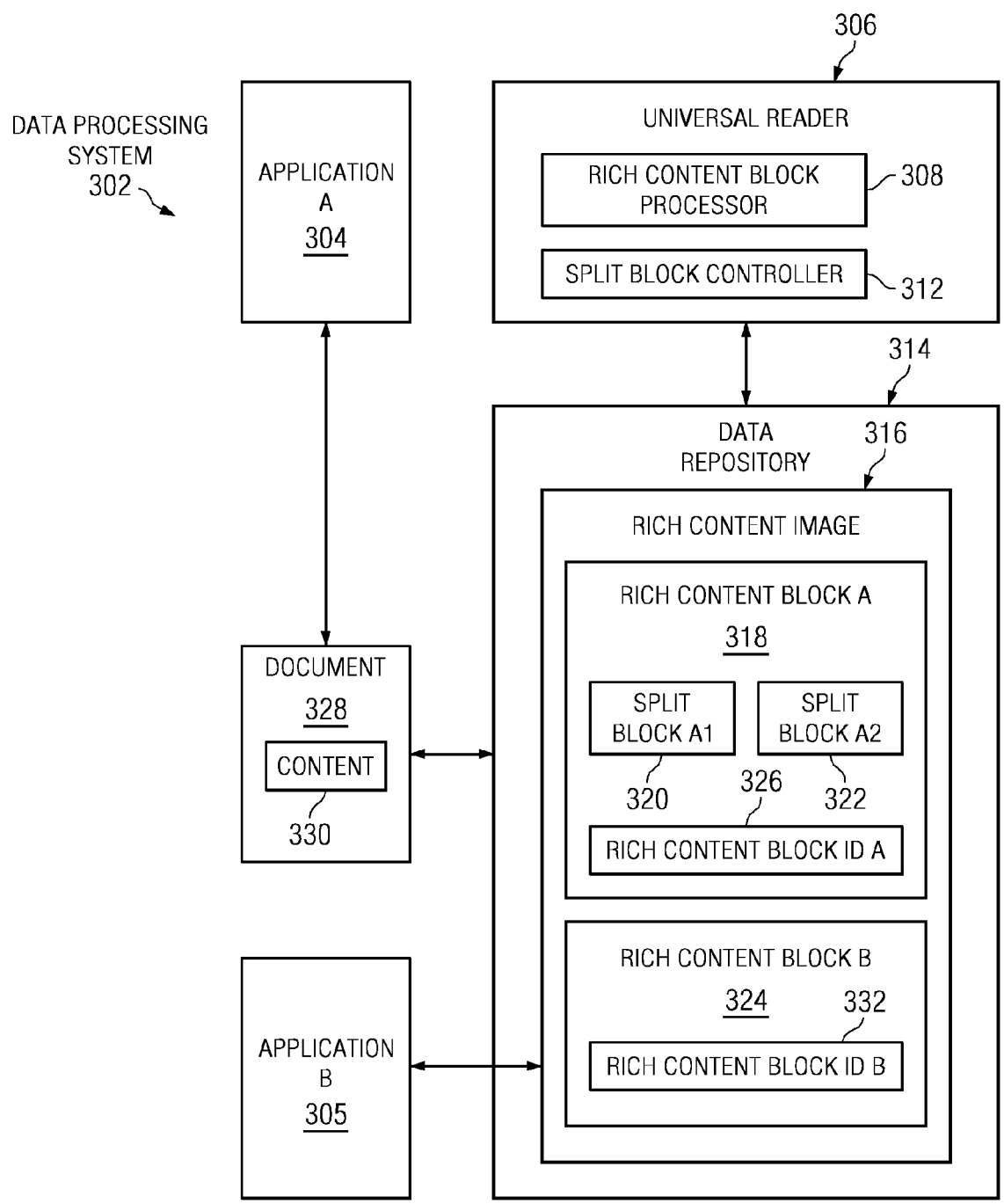
FIG. 3 is a block diagram illustrating a data flow through the universal reader wherein the universal reader is a module separate from an application in accordance with an illustrative embodiment.

FIG. 3 is a block diagram illustrating a data flow through the universal reader in accordance with an illustrative embodiment. Data processing system 302 may be implemented in any type of computing device, such as a personal computer, laptop, personal digital assistant, a server, a remote desktop computer, cellular telephone, personal digital assistant, or a remote server or any other computing device depicted in FIGS. 1 and 2.

Application A 304 and application B 305 are any types of application program associated with a document type that may be used to create, view, edit, and/or utilize functionality associated with documents corresponding to the document type. Application A 304 and application B 305 may include, but are not limited to, MICROSOFT™ software programs, LOTUS™ software programs, and/or IBM™ software programs. Application A 304 and application B 305 may be, without limitation, a word processing application, a spreadsheet, a presentation application, a power point application, an accounting program, an image processing application, or any other type of application. In this example, application A 304 and application B 305 are word processing applications. However, application A 304 is a different word processing application than application B 305. For example, application A 304 may be, without limitation, a Microsoft Word application and application B 305 may be a Word Perfect application. Universal reader 306 may store a set of rich content blocks corresponding to a set of applications. The term set as used herein, includes one or more.

Document 328 is a document generated by application A 304. Document 328 is stored in data repository 314. Content 330 is the content that makes up document 328. Content 330 is comprised of, without limitation, text, numbers, images, drawings, geometric shapes, and designs, including any fonts, shapes, colors, audiovisual graphics, numbers, and images associated with the items listed. Universal reader 306 encodes content 330 into rich content block A 318 and rich content block B 324.

Universal reader 306 is a software component for converting a document into a static image of content 330 associated with document 328 and then encoding content 330 into an image. Universal reader 306 may be located on removable storage, such as, without limitation, a floppy disk, a compact disc (CD), a flash memory, or a memory stick. Universal reader 306 may also be downloaded onto the data processing system 302 over a network, such as network 102 as seen in FIG. 1. Universal reader 306 may also be installed onto data processing system 302 from removable storage. Universal reader 306 may be a module that works separate from word processing application A 304 and word processing application B 305.

Universal reader 306 is composed of, but not limited to, rich content block processor 308 and split block controller 312. Rich content block processor 308 has multiple functions, including but not limited to processing the rich content blocks such as, rich content block A 318 and rich content block B 324.

Universal reader 306 allows a user to specify an existing document. This may be accomplished a number of ways, including, but not limited to, entering a command on a command line interface, touching an icon on a touch screen, using a mouse to drag and drop, clicking on a document file name, speaking a name of the document in association with a voice recognition system, or any other manner for specifying a user selection. Once the existing document is selected, universal reader 306 utilizes standard operating system comments to assist the user in writing the document into an image.

As part of this task, universal reader 306 assists the user to save the document to an image. Once the document is available as an image, universal reader 306, encodes the rich content as per the rich content block specification, such as rich content block specification 502 as seen in FIG. 5.

Split block controller 312 makes a determination as to whether the rich content associated with the image exceeds a threshold size per image format used in the document. In other words, split block controller 312 determines whether all the rich content can be stored in a single rich content block. If all the rich content cannot be stored in a single rich content block, split block controller 312 splits the rich content into a plurality of content blocks to form two or more split blocks. Universal reader 306 then inserts the split blocks.

Rich content block A 318 is an example of rich content stored in an image format that required splitting the rich content of document 328 into split block A1 320 and split block A2 322. Rich content block B 324 is stored in a different document format than rich content block A 318. Rich content block A 318 is stored in a document format corresponding to application A 304 and rich content block B 324 is stored in a document format corresponding to application B 305. Rich content block B 324 does not have split blocks, because the rich content in document 328 did not exceed the threshold amount of memory for the image format associated with rich content block B 324.

Split block A1 320 and split block A2 322 are rich content blocks that store rich content associated with application A 304. The rich content associated with application A 304 is divided into multiple content blocks and stored in split blocks A1 320 and A2 322. In other words, split block A1 320 contains part of the rich content associated with application 304 and split block A2 322 contains the remainder of the rich content associated with application 304. In this example, only two split blocks are utilized. However, in accordance with the illustrative embodiments, any number of split blocks may be used to store rich content associated with a single application. Split blocks are generated when the size or total number of bytes of the rich content in the document exceeds the size or the total number of bytes of the image format specification.

Rich content image 316 is comprised of rich content block A 318 and rich content block B 324. Content 330 from document 328 is embedded in rich content image 316. Rich content image 316 may include content 330 from document 328 stored in one or more document formats. In this example, rich content image 316 includes rich content block A 318 stored in a format corresponding to application 304 and rich content block B 324 stored in a format corresponding to application B 305.

Rich content block A 318 is a rich content block version of document 328, but in a different document format than rich content block B 324. For example, rich content block A 318 may be, without limitation, stored as a version of Microsoft™ Word format and rich content block B 324 may be stored in a version for Corel™ Word Perfect.

Additionally, each rich content block encoded in rich content image 316 is associated with a rich content block id number, such as rich content block id A 326 and rich content block id B 332. A rich content block id number is used by universal reader 306 to process each rich content block in numeric order in order to locate an application on data processing system 302 that allows a user to edit and manipulate the rich content located in rich content image 316.

Data repository 314 is a data storage repository for storing the document. Data repository 314 may include but is not limited to, universal serial bus (USB) stick, tape libraries, disk array controllers, tape drives, flash memory, a hard disk, and/or any other type of storage device for storing data. Rich content image 316 is stored within data repository 314.

As described above, the present invention uses a set of formatted data from a document that is stored within a custom tagged block. By defining the format within the image, the rich content from the document and information about the application used to edit the rich content can be stored within the image. For example, documents produced using IBM™ software such as Lotus Forms Viewer, normally has an extension of .xfdl and Multipurpose Internet Mail Extensions (MIME type of application /vnd.xvdl. The following is a fragment of Extensible Forms Descriptive Language (xfdl) data. <XFDL>

If this fragment of data was stored in a rich content block, this data would then look like the following:

00000001 00000004 xfdl 00000014 application/vnd.xfdl 0000001C IBM workplace Forms Document 0000002C link00000000 00000018 <XFDL>.

The term "link" in the above rich content block example may be a valid universal resource link (URL). For example, "link" may be the text "http" followed by a colon and two forward slashes, followed by a domain name such as www.ibm.com and then followed by a location such as "/software/lotus/forms/."

Universal reader 306 receives a request to initiate the process. Universal reader 306 generates document 328 into an image, such as rich content image 316. Rich content image 316 is stored in data repository 314. Universal reader 306 encodes content 330 into rich content blocks. Universal reader 306 encodes content 330 into a plurality of image formats within rich content image 316. Universal reader 306 assigns each rich content block a unique id number, such as rich content block id A 326 and rich content block id B 332.

Universal reader 306 determines whether the size of the rich content exceeds a threshold amount of memory associated with an image format. If the size of the rich content exceeds a threshold amount of memory associated with an image format, then split block controller 312 splits the rich content into a plurality of content blocks according to the image format, such as rich content block A 318 and rich content block B 324. Universal reader 306 inserts rich content block A 318 and rich content block B 324 in rich content image 316. Universal reader 306 stores rich content image 316 in data repository 314.

When a user desires to use rich content image 316, the user activates universal reader 306. User retrieves rich content image 316 from data repository 314 and opens rich content image 316 in universal reader 306. Universal reader 306 processes rich content block A 318 and rich content block B 324 in numeric order based on the rich content block id number in order to locate an application that the user can use to edit the rich content encoded in rich content image 316. If an application is located, such as application 304, then universal reader 306 inserts rich content image 316 in the application. If universal reader 306 is unable to locate an application for the user to use to open rich content block A 318 and rich content block B 324 after processing the rich content id numbers, then universal reader 306 opens an application that allows a user to, at least, view rich content image 316. Since universal reader 306 may also be an image viewer, the user may also simply view the image using universal reader 306.

The user can also specify to universal reader 306 the application that the user desires for editing and/or viewing rich content image 316.

Figures 4, 6:
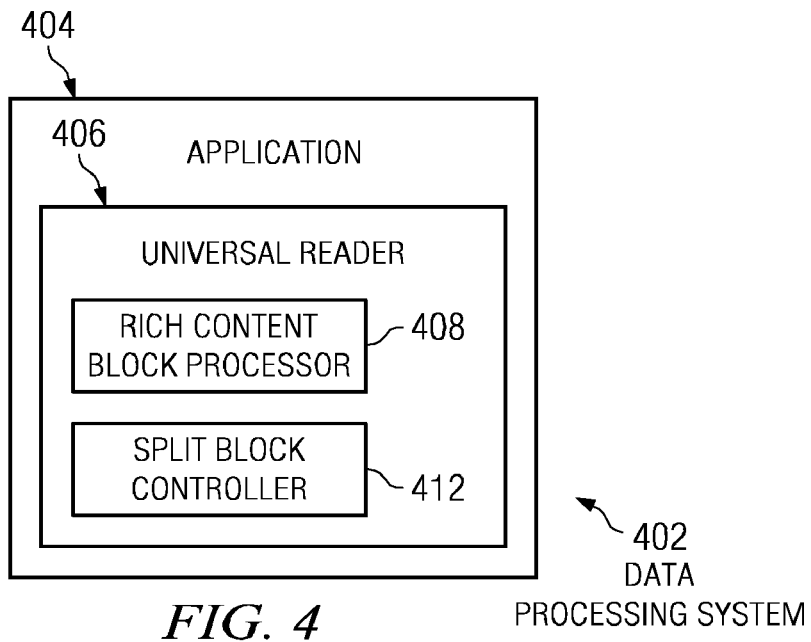
FIG. 4 is a block diagram illustrating a data flow through the universal reader embedded in an application in accordance with an illustrative embodiment.
FIG. 6 is a table describing split blocks in accordance with an illustrative embodiment.

FIG. 4 is a block diagram illustrating a data flow through the universal reader embedded into an application in accordance with an illustrative embodiment.

Universal reader 406 is a universal reader, such as universal reader 306 in FIG. 3. In this example, universal reader 406 is a module that is embedded to work within application 404. Universal reader 406 may be activated automatically after a document is generated or manually by a user.

FIG. 5 is a table describing the contents of the rich content blocks in accordance with an illustrative embodiment. 502 contains various parameters that a universal reader such as universal reader 306 and 406 use in one embodiment to write and encode the rich content of a document. However, this table is only an example of one embodiment of the universal reader.

Rich content block id 504 is an id number unique to the rich content block represented in table 502. Rich content block id 504 is used by universal reader 306 to process the rich content blocks in order to determine the first application available on a data processing system for editing the rich content of an image.

Data length 506 indicates the size of the document by indicating the number of bytes of the document. 508 is the number of actual bytes representing the rich content.

Referring to FIG. 6, a table describing the contents of a split block is depicted in accordance with an illustrative embodiment. Table 602 is a table representing a split block. Table 602 contains various parameters that an application such as split block controller 312 in FIG. 3 uses in one embodiment to split and encode the rich content of a document. Rich content block id 604 is an id number unique to the rich content block represented in table 602. Sequence Number 606 represents the sequence number, starting from 1 of a split block. A sequence number is used to recombine the different split blocks so as to determine the order for recombining. Thus, the split block should contain a sequence number that allows for easy recombining of the entire rich content block, because the positioning of successive custom tagged blocks can be variable, and the location of these blocks can change. Data length 608 is the number of bytes of data in this split block. 610 is a number representing the actual bytes representing the data in this split block.

Figure 7:
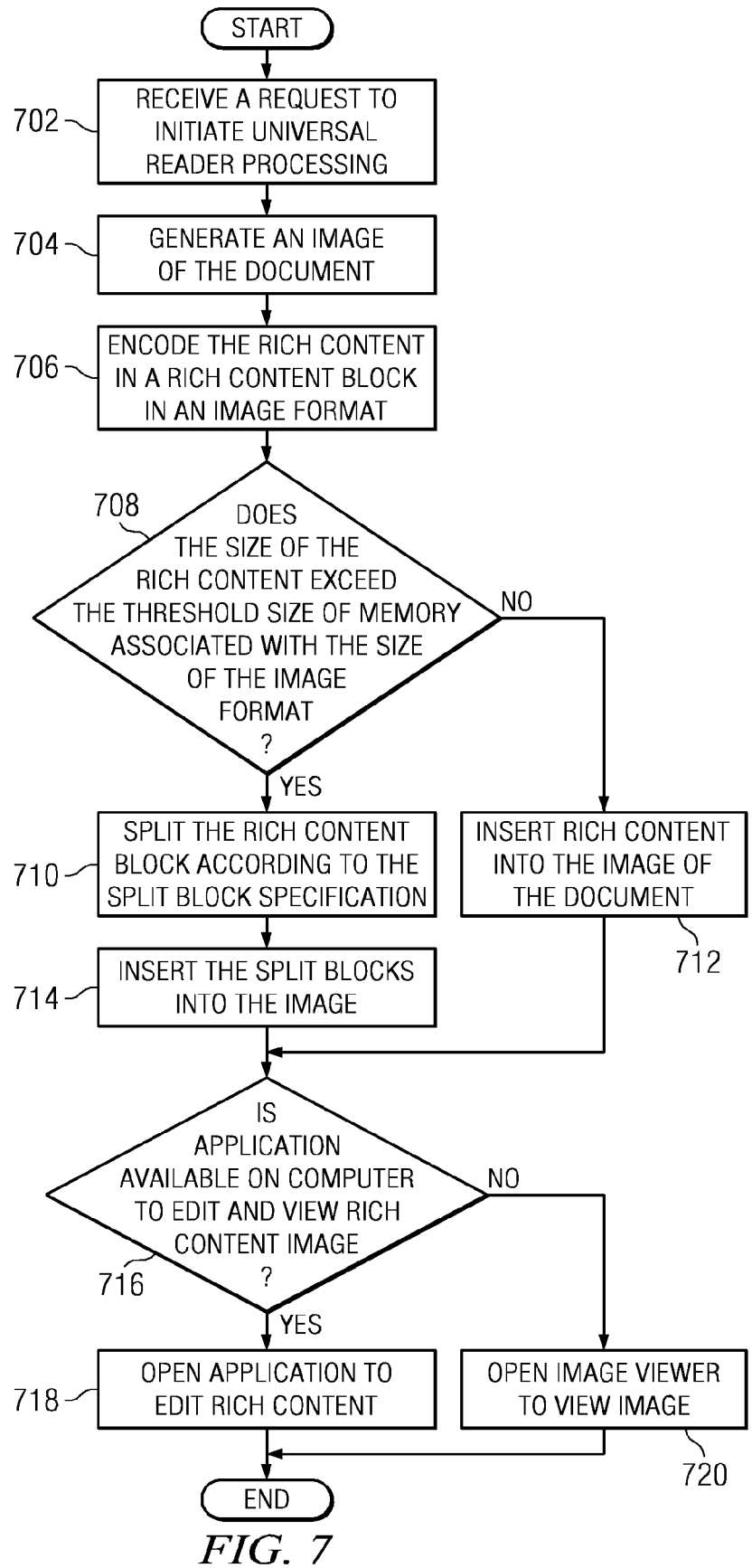
FIG. 7 is a flowchart illustrating a process for a document to be processed by a universal reader in accordance with an illustrative embodiment.

Referring to FIG. 7, a flowchart illustrating a process for a document to be processed by the universal reader is depicted in accordance with an illustrative embodiment. The process in FIG. 7 generates an image of a document and encodes the rich content of the document into the generated image. This process is implemented by a software component for generating an image of a document, such as universal reader 306 in FIG. 3.

The process starts by receiving a request to initiate universal reader processing (step 702). Next, the process generates an image of the document (step 704). The process then encodes the rich content in a rich content block in an image format (step 706).

Next, the process makes a determination whether the size of the rich content block exceeds a threshold size of memory associated with the size of the image format (step 708). If the size of the rich content does exceed a threshold size of memory associated with the size of the image format, then the process splits the rich content block according to the split block specification (step 710). Next, the process inserts the split blocks into the image (step 714). If the size of the rich content does not exceed the threshold size of memory according to the size of the image format, then the process inserts the rich content block into the image of the document (step 712). Next, the process determines whether the application is available on the computer to edit and view the rich content image (step 716).

If the application is available on the data processing system to edit and view the rich content image, then the process opens the application (step 718). If the application is not available to edit and view the rich content image, then the process opens an image viewer on the data processing system to view the image (step 720). The process terminates thereafter.

Figure 8:
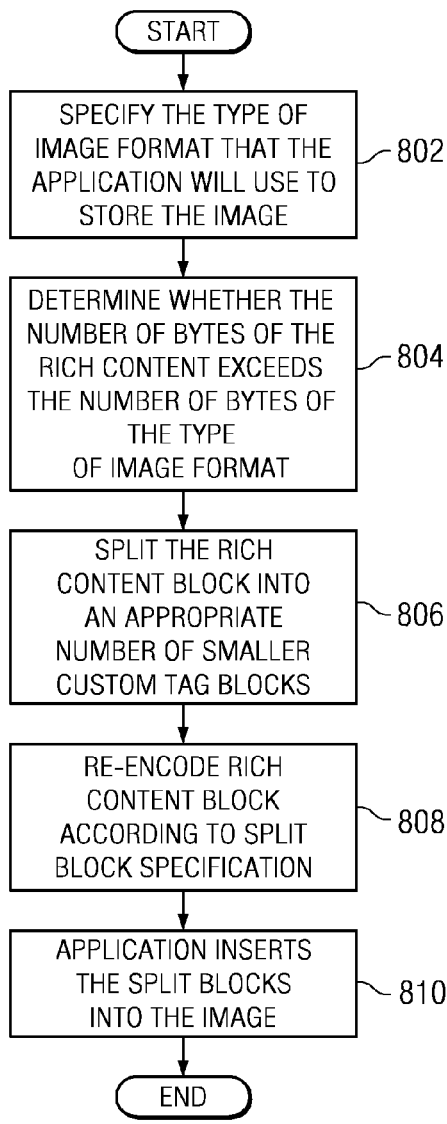
FIG. 8 is a flowchart illustrating a process for a document to be processed through the universal reader wherein split blocks are present.

FIG. 8 is a flowchart illustrating a process for a document to be processed through the universal reader using a Split Block Specification. The process in FIG. 7 generates a split block. This process is implemented by a software component for generating a split block, such as universal reader 306 in FIG. 3.

The process starts by specifying the type of image format that the application will use to store the image (step 802). Next, the process determines whether the number of bytes of the rich content exceeds the number of bytes of the type of image format (step 804). Next, the rich content block is split into an appropriate number of smaller custom tag blocks (step 806). Next the process re-encodes the rich content block according to the split block specification (step 808). Next, the application inserts the split blocks into the image (step 810). The process terminates thereafter.

Figure 9:
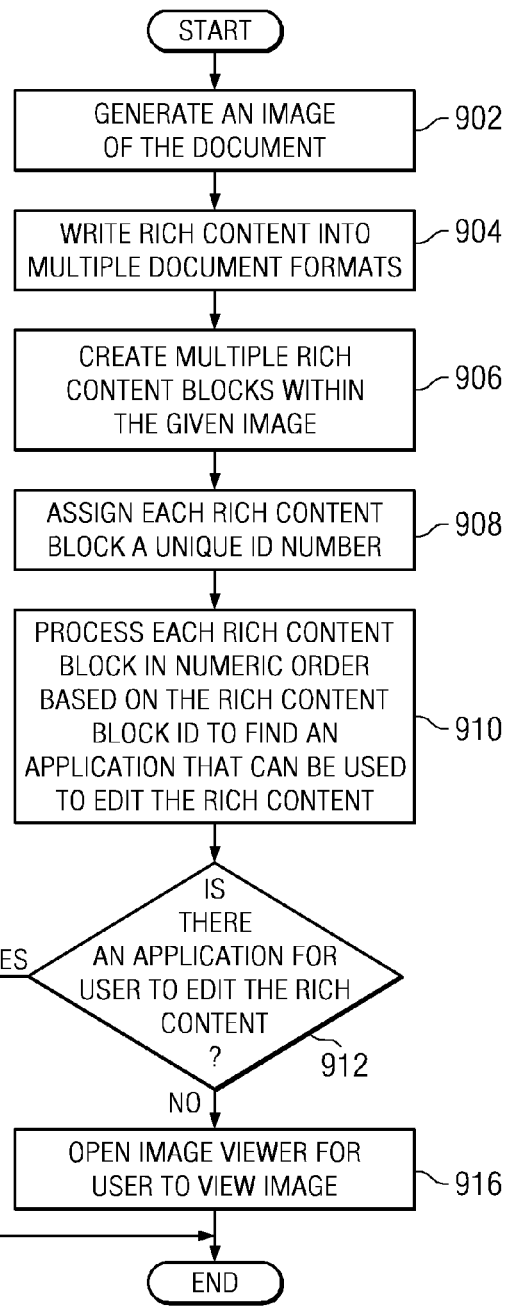
FIG. 9 is a flowchart illustrating a process for writing multiple rich content blocks into an image of a document.

FIG. 9 is a flowchart illustrating a process for writing multiple rich content blocks into an image of a document. The process is implemented by a software component for writing multiple rich content blocks, such as universal reader 306 in FIG. 3.

The process starts by generating an image of a document (step 902). Next, the process writes the rich content into multiple document formats (step 904). The process then creates multiple rich content blocks within the given image (step 906). Next, the process assigns each rich content block a unique id number (step 908). Next, each rich content block is processed in numeric order based on the rich content block id to find an application that can be used to edit the rich content (step 910). Next, the process makes a determination whether there is an application on the data processing system for the user to edit the rich content (step 912). If there is an application for the user to edit the rich content, then the process inserts the image into the application (step 914). The process terminates thereafter. If there is not an application for the user to edit the rich content, then the process opens an image view for the user to view the image (step 916). The process terminates thereafter.

Thus, the illustrative embodiments solve the problems associated with utilizing documents whose applications may no longer be located on a data processing system. Traditional data processing systems either return an error message to a user if an application for a document is not located or the data processing system may only provide an image viewer to view the document. However, the user is unable to edit the document without regenerating a copy in an alternate application.

The different embodiments write the document into an image format and then utilize standard image formats, such as JPEG, TIFF, and PNG to store the rich content of the document. Thus, the universal reader provides a long term storage format for word documents.

If an application stores the rich content of a document within an image version of the document, then the image can be viewed, regardless of whether the application was already installed on the data processing system. However, if the application was installed, then the full features of the application would be available to the user, because the rich content enables the document to be editable. Additionally, the user may manually specify to the universal reader an application located on data processing system for editing and viewing the image. This is advantageous for users who are already aware that the data processing system contains an application compatible with the rich content image.

The invention is described as a universal reader, because the invention enables a user to have a "universal read" of any document, regardless of whether the application that created the original document was maintained on a data processing system. However, an advantage of the invention is that if the application were maintained on a data processing system, then the user would have access to the rich content of the document, and thus the full features of the application, instead of merely an image format.

Most applications have a process for creating an image of their own document. However, this invention provides a method for storing the rich content of a document. This process may be performed automatically or it may also be performed manually by the user. An additional benefit of this embodiment is that this software enables archiving all the time of any document on a data processing system, and still retaining a live, rich document that is both functional and readable. This invention provides an option for users interested in maintaining an electronic copy of an original document without being concerned about constant upgrades to program applications such as Microsoft™ products or Adobe Acrobat™ products. The current invention essentially enables all such programs with this one invention.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for embedding rich content associated with a document in an image, the method comprising:
    generating a static image of the document;
    determining whether an amount of memory required by the rich content exceeds a threshold amount, wherein the rich content comprises a rich content version of the document that retains document functionality;
    responsive to a determination that the amount of memory associated with the rich content does not exceed the threshold amount, encoding the rich content into a single content block according to an image format to form a rich content block; and
    inserting the rich content block into an arbitrary storage location associated with the image, wherein the static image of the document is displayed when the image is opened by a computing device in an absence of an application associated with the rich content of the document, and wherein the rich content is displayed when the image is opened by the computing device in a presence of the application associated with the rich content of the document.

2. The computer implemented method of claim 1, wherein the rich content includes formatting commands for page layout such as fonts, bold, underline, italicize, bullet points, numbering, spacing, text size, or text language.

3. The computer implemented method of claim 1, wherein the rich content further comprises graphical and audiovisual content.

4. The computer implemented method of claim 1, further comprising:
    responsive to a determination that the amount of memory associated with the rich content does exceed the threshold amount, encoding the rich content into a plurality of content blocks according to the image format to form a set of split blocks; and
    inserting the set of split blocks into the arbitrary storage location associated with the image, wherein the static image of the document is displayed when the image is opened by a computing device in an absence of the application corresponding to the rich content of the document, and wherein the rich content is displayed when the image is opened by the computing device in a presence of the application corresponding to the rich content of the document.

5. The computer implemented method of claim 4, wherein inserting the set of split blocks further comprises:
    generating a sequence number for each split block in the set of split blocks, wherein the each split block in the set of split blocks is recombined in accordance with the sequence number.

6. The computer implemented method of claim 1, further comprising:
    selecting an image format in a plurality of image formats to form a selected image format; and
    storing the rich content block in the selected image format in the image, wherein rich content blocks are stored in multiple document formats within the image.

7. The computer implemented method of claim 1 wherein the rich content block is a first rich content block, wherein the rich content associated with the rich content block is rich content associated with a first application corresponding to the document, and further comprising:
    encoding rich content associated with a second application corresponding to the document into a content block according to a document format to form a second rich content block.

8. The computer implemented method of claim 7, further comprising:
    responsive to opening the image, by the computing device, in a presence of the first application corresponding to the document, displaying the rich content associated with the first rich content block.

9. The computer implemented method of claim 7, further comprising:

responsive to opening the image, by the computing device, in a presence of the second application corresponding to the document, displaying the rich content associated with the second rich content block.

10. The computer implemented method of claim 7, further comprising:
responsive to opening the image, by the computing device, in an absence of the first application and an absence of the second application, displaying the static image of the document.

11. A computer program product for embedding rich content of associated with a document in an image, the computer program product comprising:
a non-transitory computer readable medium;
program code stored on the non-transitory computer readable medium for generating a static image of the document;
program code stored on the non-transitory computer readable medium for determining whether an amount of memory required by the rich content exceeds a threshold amount, wherein the rich content comprises a rich content version of the document that retains document functionality;
program code stored on the non-transitory computer readable medium for responsive to a determination that the amount of memory associated with the rich content does not exceed the threshold amount, encoding the rich content into a single content block according to an image format to form a rich content block; and
program code stored on the non-transitory computer readable medium for inserting the rich content block into an arbitrary storage location associated with the image, wherein the static image of the document is displayed when the image is opened by a computing device in an absence of an application associated with the rich content of the document, and wherein the rich content is displayed when the image is opened by the computing device in a presence of the application associated with the rich content of the document.

12. The computer program product of claim 11, wherein the rich content includes formatting commands for page layout such as fonts, bold, underline, italicize, bullet points, numbering, spacing, text size, or text language.

13. The computer program product of claim 11, wherein the rich content further comprises graphical and audiovisual content.

14. The computer program product of claim 11, further comprising:
program code stored on the non-transitory computer readable medium for responsive to a determination that the amount of memory associated with the rich content does exceed the threshold amount, encoding the rich content into a plurality of content blocks according to the image format to form a set of split blocks; and
program code stored on the non-transitory computer readable medium for inserting the set of split blocks into the arbitrary storage location associated with the image, wherein the static image of the document is displayed when the image is opened by a computing device in an absence of the application corresponding to the rich content of the document, and wherein the rich content is displayed when the image is opened by the computing device in a presence of the application corresponding to the rich content of the document.

15. The computer program product of claim 11, wherein program code stored on the non-transitory computer readable medium for inserting the set of split blocks further comprises:
program code stored on the non-transitory computer readable medium for generating a sequence number for each split block in the set of split blocks, wherein the each split block in the set of split blocks is recombined in accordance with the sequence number.

16. The computer program product of claim 11, further comprising:
program code stored on the non-transitory computer readable medium for selecting an image format in a plurality of image formats to form a selected image format; and
storing the rich content block in the selected image format in the image, wherein rich content blocks are stored in multiple document formats within the image.

17. The computer program product of claim 11, wherein the rich content block is a first rich content block, wherein the rich content associated with the rich content block is rich content associated with a first application corresponding to the document, and further comprising:
program code stored on the non-transitory computer readable medium for encoding rich content associated with a second application corresponding to the document into a content block according to a document format to form a second rich content block.

18. The computer program product of claim 17, further comprising:
program code stored on the non-transitory computer readable medium for responsive to opening the image, by the computing device, in a presence of the first application corresponding to the document, displaying the rich content associated with the first rich content block.

19. The computer program product of claim 17, further comprising:
program code stored on the non-transitory computer readable medium for responsive to opening the image, by the computing device, in a presence of the second application corresponding to the document, displaying the rich content associated with the second rich content block; and
program code stored on the non-transitory computer readable medium for responsive to opening the image, by the computing device, in an absence of the first application and an absence of the second application, displaying the static image of the document.

* * * * *